June 2, 1953 — H. B. KUSTER — 2,640,706
TRAILER INDIVIDUAL WHEEL SUSPENSION
Filed March 4, 1952 — 6 Sheets-Sheet 1

INVENTOR,
HARRY B. KUSTER,
By Herbert A. Newturner,
ATTORNEY.

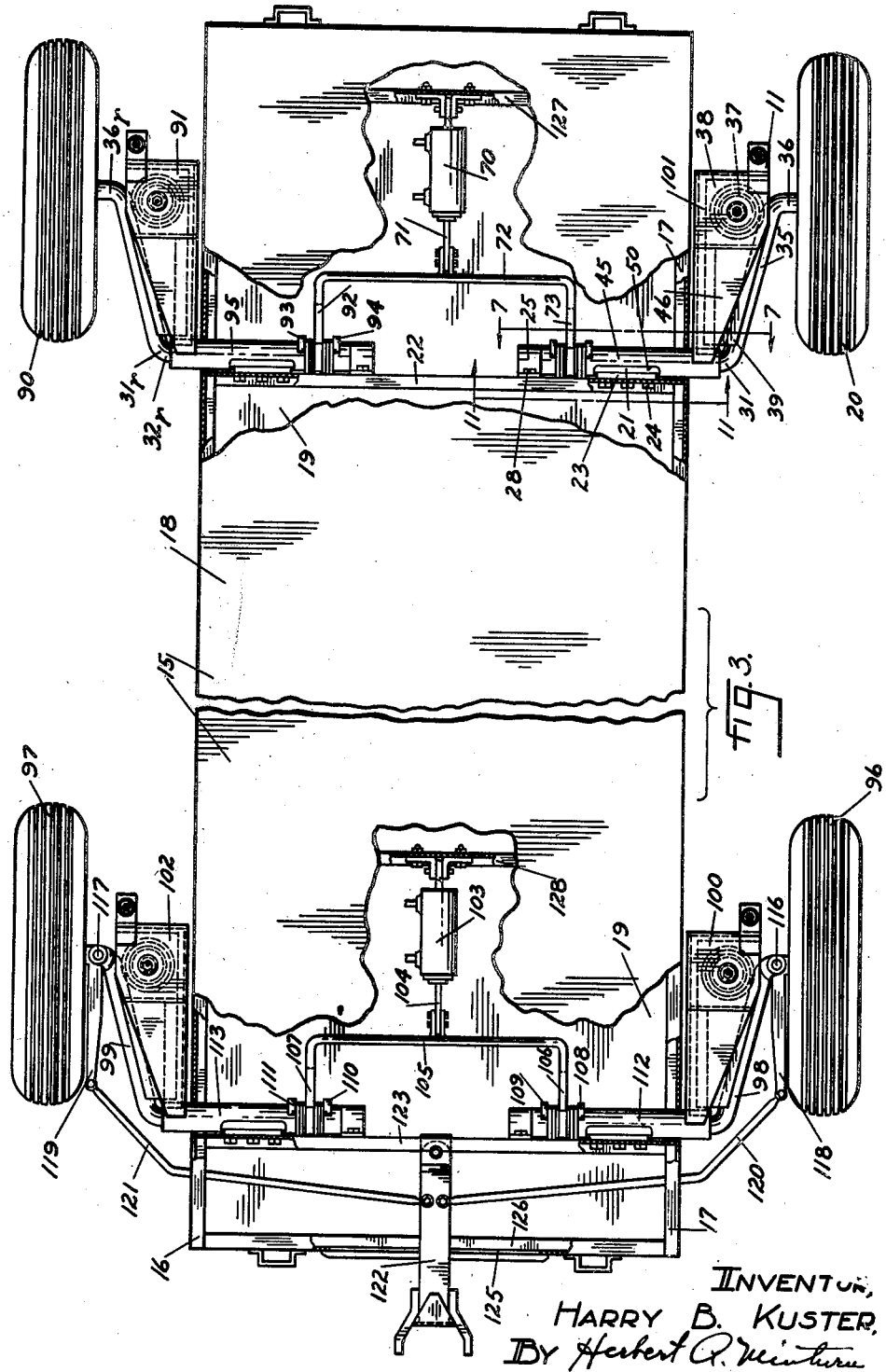

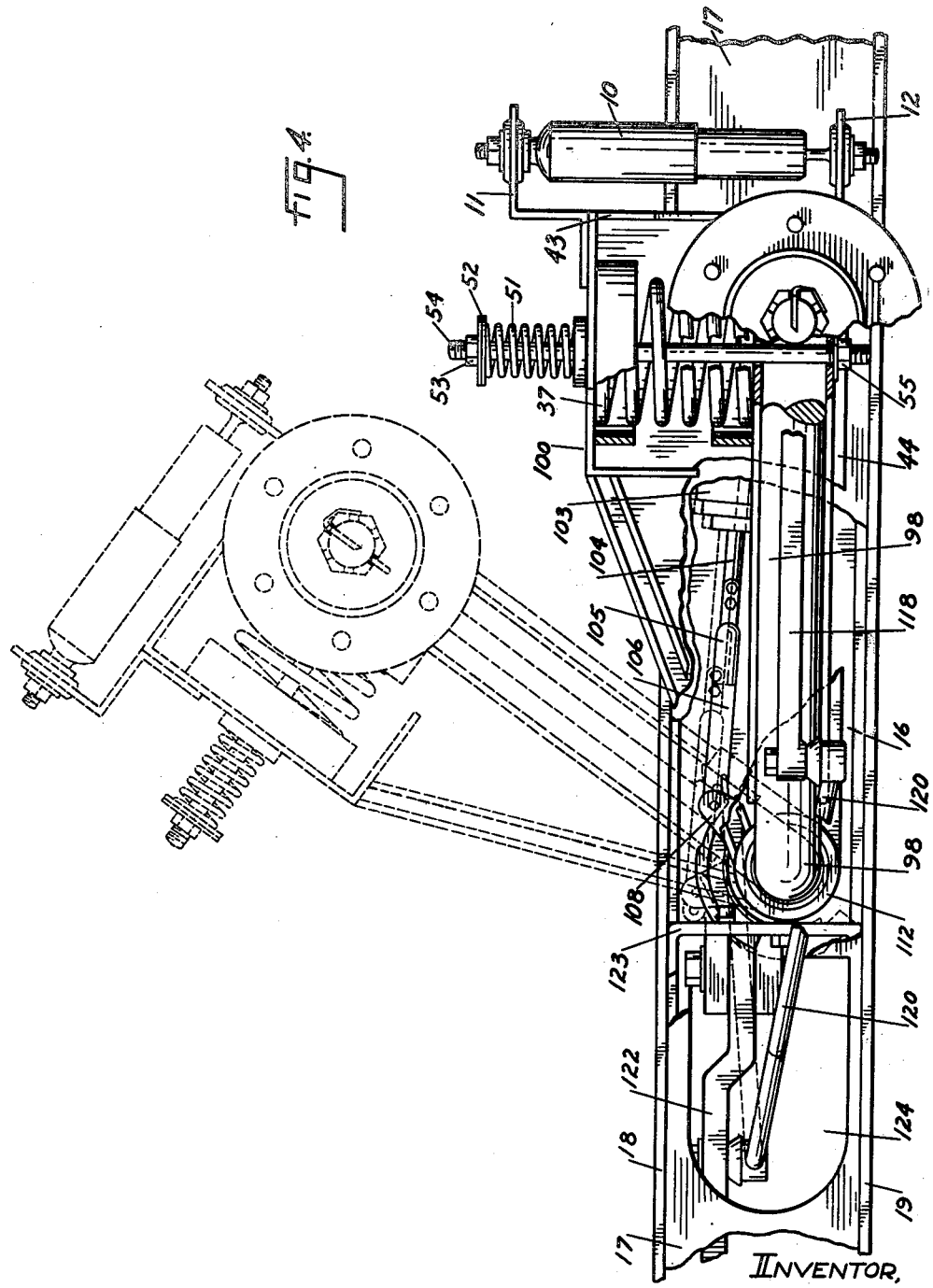

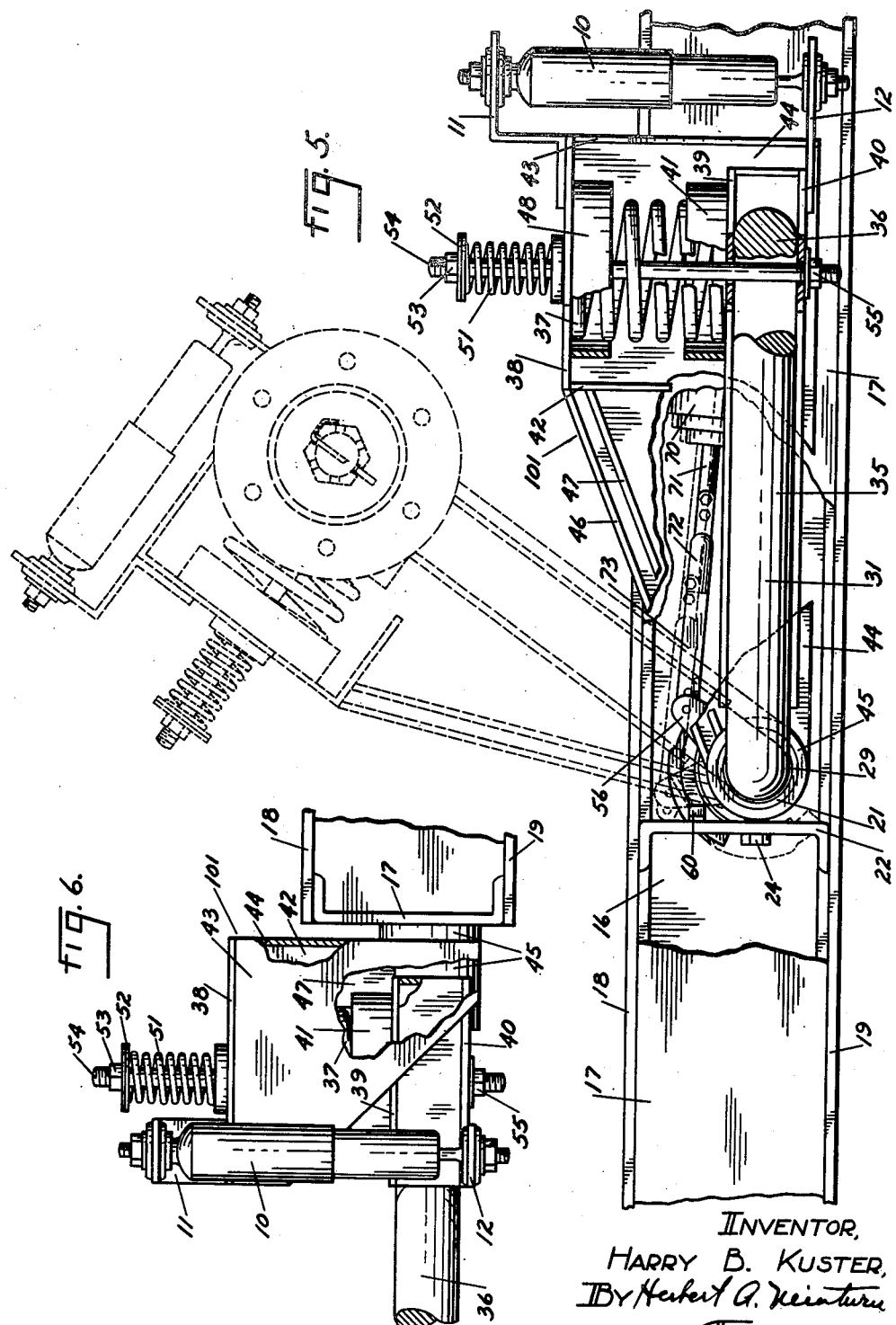

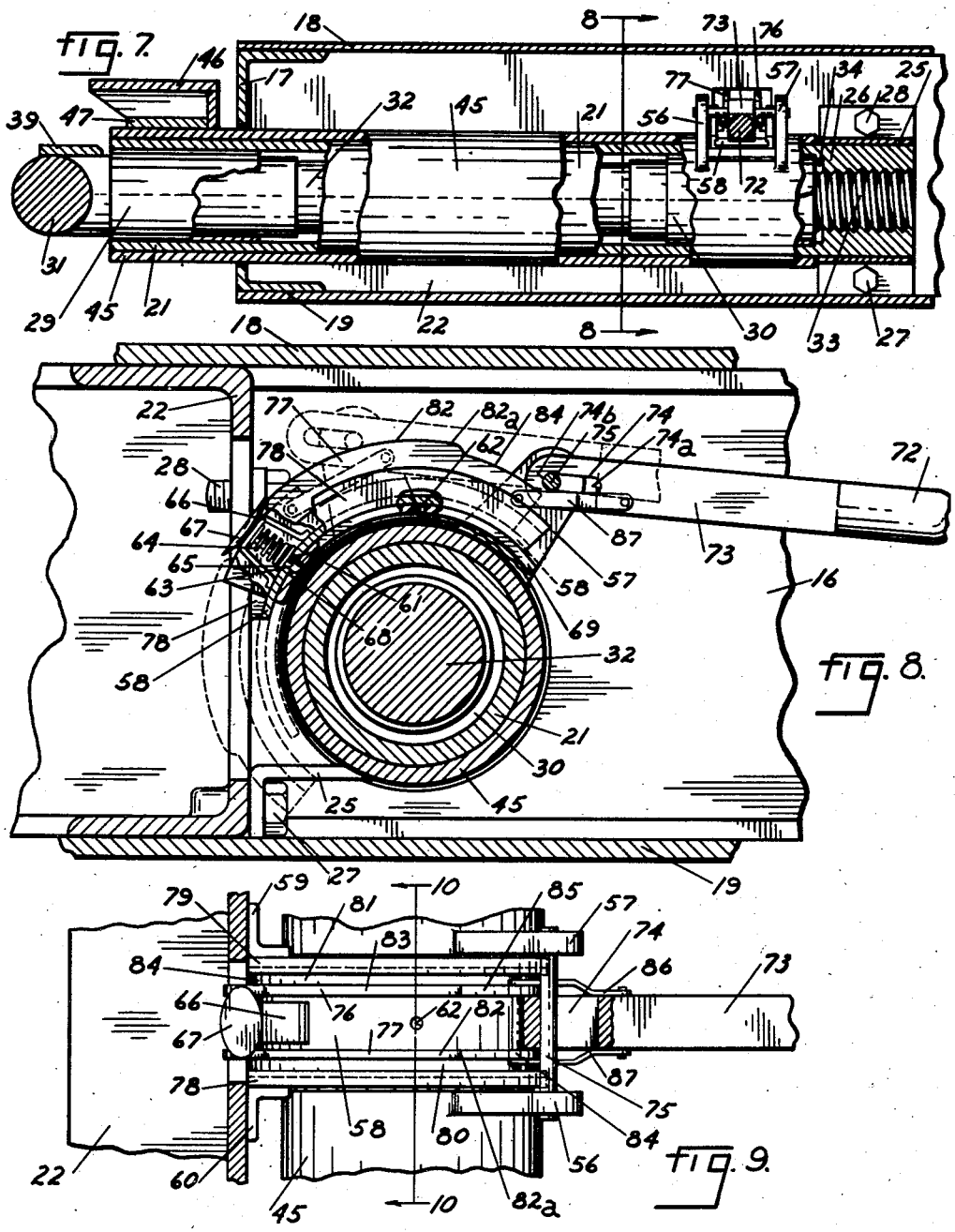

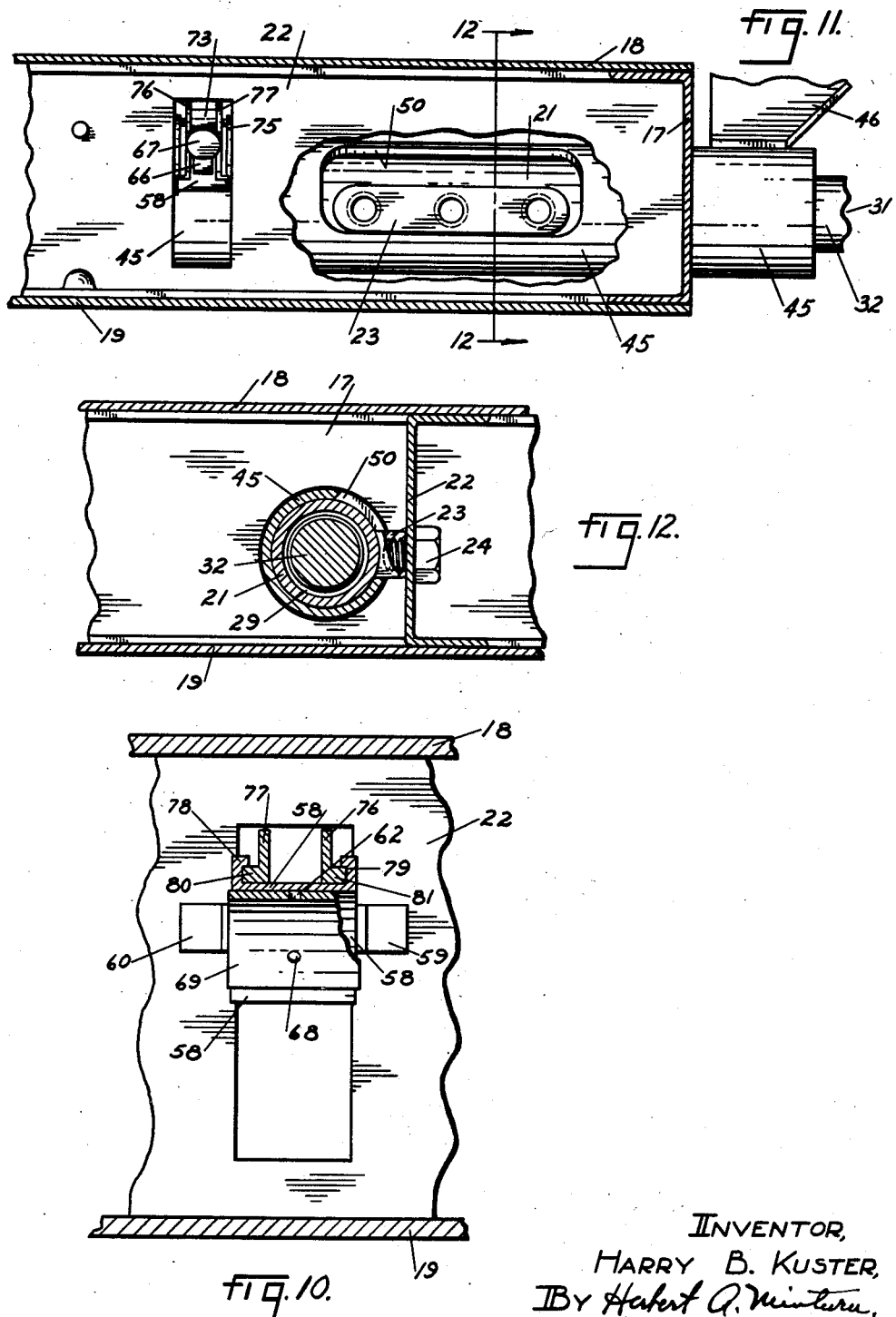

Patented June 2, 1953

2,640,706

UNITED STATES PATENT OFFICE 2,640,706

TRAILER INDIVIDUAL WHEEL SUSPENSION

Harry B. Kuster, Cambridge City, Ind., assignor to Converto Mfg. Co., Inc., Cambridge City, Ind., a corporation of Indiana Application March 4, 1952, Serial No. 274,793

11 Claims. (Cl. 280—11)

This application relates to a four-wheel trailer wherein each wheel is individually sprung, each wheel being carried on a crank arm axle.

Unique characteristics of the invention are found in that the entire mechanism of wheel suspension and also front wheel steering is confined to within or above the plane of the under side of the trailer frame whereby, in extremely adverse conditions, should the wheels mire down, the frame would serve as a "mud boat" in order that the trailer could be pulled along over the ground in the absence of being supported by the wheels; in the ability to lower the frame to substantially ground level for easy loading of the trailer and then raising the loaded frame, or the reverse; the securing of unusual stability under high speeds, eliminating hurtling and rebounding effects when the wheels are carried across deep depressions or elevations such as railroad crossings or chuck holes; in the absence of any noticeable side sway at various speeds of travel; all such that the trailer makes an admirable structure for farm use as well as city use, and most importantly for use in military movements of materials over cross-country as well as on previously prepared road beds.

Further important advantages and characteristics of the invention will become apparent to those versed in the art in the following description of one particular form of the invention as illustrated in the accompanying drawings, in which:

Fig. 3 is a view in top plan in partial section to disclose interior mechanisms;

Fig. 4 is a view in detail on an enlarged scale of the suspension of a front steerable wheel as viewed from the left side of the structure;

Fig. 5 is a like view of the spring suspension, applied to the left rear wheel;

Fig. 6 is a view in back elevation and partial section in detail of the spring arrangement;

Fig. 7 is a detail in vertical section on an enlarged scale on the line 7—7 in Fig. 3;

Fig. 8 is a detail in section on a further enlarged scale on the line 8—8 in Fig. 7;

Fig. 9 is a detail in top plan view and partial section of an "up or down" locking mechanism;

Fig. 10 is a view in vertical section on the line 10—10 in Fig. 9;

Fig. 11 is a detail in transverse section on the line 11—11 in Fig. 3; and

Fig. 12 is a view in fore and aft section on the line 12—12 in Fig. 11.

Figure 1:
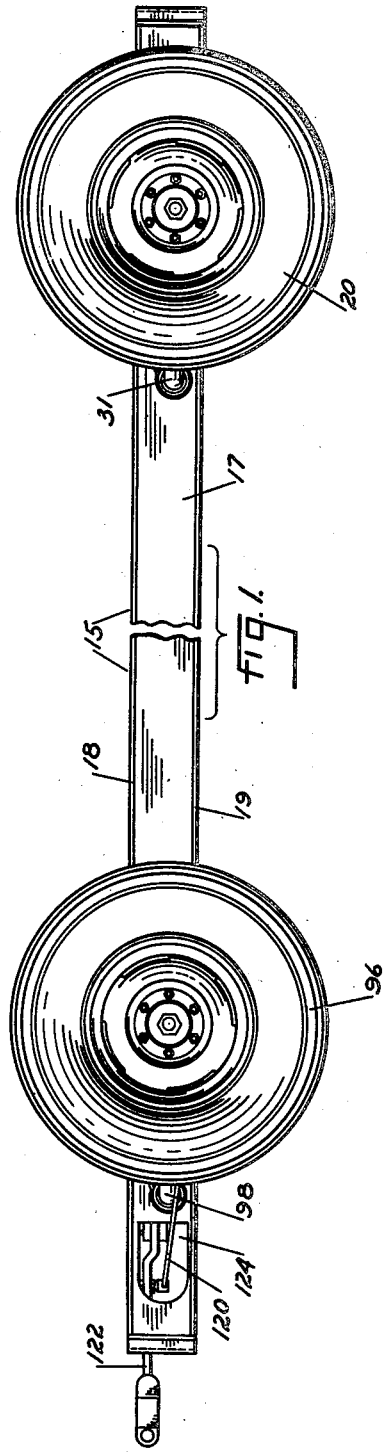
Fig. 1 is a view in side elevation of a structure embodying the invention.

The frame of a trailer is generally designated by the numeral 15, and comprises in general a pair of side channels 16 and 17, interconnected by a top plate 18, and preferably by an under or bottom plate 19.

Referring to the suspension of the rear wheels, and specifically by way of example to the suspension of the right rear wheel 20, there is a tubular housing 21 to be attached along a transverse channel member 22 which extends and is secured to the side channels 16 and 17. This attachment of the member 21 to the channel 22 is, in the present showing, accomplished through an elongated boss 23 which extends from a side of the housing 21 to abut by its outer side against the channel member 22, Fig. 12. Cap screws 24, herein shown as three in number, extend through the channel 22 to screw-threadedly engage in this boss 23. The inner end portion of this axle housing 21 is further secured as a matter of precaution by means of a strap 25 which surrounds that end portion designated by the number 26 to be in turn secured to the channel 22 by means of the two bolts 27 and 28. As indictaed in Fig. 7, this housing 21 extends outwardly through the side channel member 17 to extend a distance therebeyond.

At the outer end of the housing 21, there is located a bushing 29, and a like bushing 30 at an inner end portion thereof.

An axle generally designated by the numeral 31 has a straight end bearing length 32 revolubly extending through the bushings 29 and 30 to have a screw-threaded end 33 screw-threadedly engaging in the end portion 26 of the axle housing 21. As indicated in Fig. 7, there is a space 34 left between the inner end of the axle length 32 and the beginning of the threaded portion 33 so that this length 32 may be free to screw into and out of the end portion 26 as the length 32 may be revolved.

This threaded interconnection between the axle length 32 and the housing end 26 constitutes not only means for retaining the length 32 in its longitudinally disposed position, that is against being withdrawn from the housing 21, but it also serves as a thrust bearing. The slight longitudinal travel set up in the length 32 by a partial revolution of that length does not amount to more than the corresponding fraction of the pitch of the thread on the end 33.

From this fixed end 32, the axle 31 extends by an arm 35 diagonally rearwardly and outwardly to terminate in an outturned end portion 36 which is parallel to the axle length 32. On this end portion 36, the wheel 20 is revolubly mounted in any suitable manner such as is customary in automotive practice, the details of which do not constitute a part of the invention per se, and hence are not shown.

The upward travel of the axle end 36 is resiliently resisted by a coil spring 37. The lower end of this spring 37 is carried between the axle arm 35 and an upper member 38 which is normally fixed relative to travel of the arm 35, and to the frame 15. In the present description of the invention, this fixing of the upper bearing member 38 in relation to the frame 15 may be varied for the purpose of relatively lowering and lifting the frame 15 in respect to the wheels supporting the structure.

For convenience in building up a support for the under side of the spring 37, a pair of plates 39 and 40 are fixed respectively to the top and bottom sides of the arm 35. A cup 41 is fixed to the top plate 39, and within this cup 41 the lower end of the spring 37 is carried.

In the present showing, the upper member 38 constitutes a flat plate which has outer brackets 42 and 43 extending from its under side downwardly and rearwardly to be fixed to a back plate 44. This back plate 44 extends forwardly to have its front end engaged to a sleeve 45 which telescopes over the axle housing 21 in a revoluble manner. Then there are a pair of spaced brace members 46 and 47 extending in spaced relation along the upper marginal portion of the plate 44 from the sleeve 45 to the vertically disposed brace 42, Fig. 5.

Under the plate 38 there is secured an annular collar 48 within which the upper end of the spring 37 is carried to have that end of the spring bear as above indicated against the under side of the plate 38.

The sleeve 45 is provided with a window 50 extending longitudinally of the sleeve, and through which the projecting lug 23 may extend. The window 50 has a circumferential opening sufficient to permit the axle length 32 to revolve the angular degree of travel permissible within the limits of the spring 37. The horizontal edges of the window 50 serve as limiting stops in the up and down directions of travel of the axle length 32 in respect to its revolving within its housing 21. Normally this sleeve 45 is held fixed in respect to its permissible circumferential travel about the housing 21. It is to be noted, Fig. 7 as well as in Fig. 11, that the sleeve 45 is coextensive at least with the length of the housing 21 therewithin, wherein both those members extend outwardly through the side channel 17 of the frame 15.

Preferably a rebound control spring 51, Figs. 5 and 6, is provided to be mounted on the top side of the plate 38. This rebound spring 51 bears by its lower end against the plate 38, and by its upper end against a plate or washer 52 which is held compressibly against the top end of the spring 51 by means of a nut 53 screw-threadedly carried on the upper end of the bolt 54 which in turn extends axially down through the spring 51, the plate 38, centrally through the spring 37, through the plate 39, through the plate 40, to have a nut 55 on its lower end. By means of adjusting these nuts 53 and 55, the degree of compression required on the spring 51 to control the rebound may be quickly secured.

Then in addition, there is preferably provided a shock absorber 10 interconnected between the plate 38 and the plate 40 by means of the brackets 11 and 12 respectively, Figs. 5 and 6.

It is necessary that the plate 38 be held normally in a fixed position in respect to the plate 39. This may be accomplished in a number of different ways, being in any event fixed in relation to the frame 15. In the form herein shown this plate 38 is fixed in relation to the circumferential position of the sleeve 45. This sleeve 45 is held in at least two different positions selectively by means of a shiftable pin interconnection. These two positions consist of that position shown in solid lines, Fig. 5, or in the elevated position shown in the dash lines. In the elevated position, the various parts are shown in those positions wherein the frame 15 would be lowered to its lowermost position, substantially or actually on the ground level upon which the wheels would rest.

One particular manner in which the sleeve 45 is secured in either one of those two positions is illustrated in Figs. 7–9 primarily. To the sleeve 45 there are fixed in horizontal spaced relation the levers 56 and 57.

Figure 2:
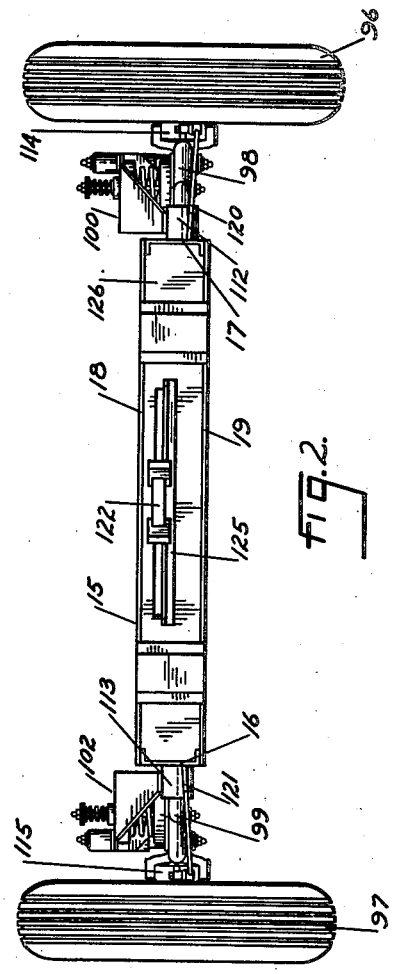
Fig. 2 is a view in front end elevation.

An arcuate band 58 is anchored to the cross channel 22 by any suitable means, such as by the brackets 59 and 60 to extend concentrically around and over the upper portion of the sleeve 45. This band 58 is provided with the hole 61. A pin 63 is mounted radially of this band 58 to extend slidingly therethrough, and to be urged to travel therethrough by means of a compression spring 64 surrounding it and bearing against a shoulder 65 fixed to the pin 63 above the band 58. This spring 64 bears by its outer end against a guide bracket 66 which supports the outer end of the pin 63 under a head 67 which has a convex undersurface. In Fig. 3, the pin 63 is shown as extending inwardly to its innermost possible position, which position corresponds to that when the sleeve 45 has been revolved to lift the frame 15 to its normal traveling level in respect to the wheels, being that position as shown in Figs. 1 and 2.

In this position, the pin 63 is not only extending through the band 58, but also enters an opening 68 which is provided in a member 69 which travels with the sleeve 45. In the present form, this member 69 is secured between the levers 56 and 57 to travel around and under the band 58 in close proximity thereto. In this manner, the two members 58 and 69 are interlocked through the pin 63 so that there can be no circumferential travel of the sleeve 45 around the axle housing 21.

In order to raise and lower the frame 15 relative to the wheels, some suitable means must be provided. In the present form a hydraulic system is illustrated wherein there is a double acting hydraulic control cylinder 70, Fig. 3, the piston rod 71 of which rigidly interconnects with the yoke bar 72, one end 73 of which extends forwardly to be interconnected with the levers 56 and 57. The cylinder 70 and the yoke 72 are preferably carried between the upper and lower frame plates 18 and 19 so as to be concealed from the weather and also splashing effects of mud and snow and the like.

The forward end of the yoke member 73 is provided with a longitudinally extending slot 74 through which there is a pin 75 interconnecting by its ends with the levers 56 and 57. This slot and pin interconnection provides a lost motion travel effect as between the member 73 and the levers 56, 57. The purpose of this lost motion is to permit the disconnecting of the pin 63 from the member 69 before the sleeve 45 may be rocked by forward travel of the yoke 72 as influenced by the action of the cylinder 70. During the forward travel of the member 73, Figs. 8, 9, and 10, there is a lifting action of the pin 63 set up. This lifting action is carried out by means of a pair of cam plates 76 and 77 which are mounted in spaced relation between the upturned side members 78 and 79 along the member 58. These members 76 and 77 have outturned feet 80 and 81 respectively which engage in grooves provided on the inside opposing faces of the sides 78 and 79, Fig. 10. Each of these cam plates 76 and 77 is provided with a central circumferential length 82 and 83 respectively to have a curvature of a greater radial length than do the end portions 84 and 85 of those plates.

These two cam plates 76 and 77 are interconnected to the yoke arm end portion 73 by means of links 86 and 87 so that immediately the member 73 is pushed to the left, Fig. 8, these cam plates 76 and 77 are forced to travel around the member 58 to bring the elevated surface 82 under the head 67 of the pin 63 and thereby retract it from the hole 68, by the time the member 73 has traveled sufficiently far to bring the end 74a of the slot 74 into contact with the pin 75, at which time, the shoulder 82a, Fig. 8, has passed on around beyond the head 67 to the dash line position so as to permit the pin 63 to have its lower end then rest against the outer surface of the member 69, until the member 69 has been carried on around far enough to bring the hole 62 into registry with the pin 63 to permit the pin 63 to drop therein, which condition will then effectively latch the sleeve 45 into the platform lowered position in respect to the wheels. Then when the platform is to be raised again, the initial travel of the member 73 to the right will cause the cam plates 76 and 77 to be pulled on around therewith before the end 74b of the slot 74 strikes the pin 75 to start rocking the sleeve 45, during which the pin 63 will have been pulled out from registry between the two members 58 and 69 so that the sleeve 45 will then be rocked by the time the end 74b strikes the pin 75 to pull it on around, at the end of which travel the pin 63 will drop back into that position as shown in Fig. 8.

The right hand wheel 90 is supported and carried in exactly the same manner as is the left hand wheel 20 as has been described. The wheel 90 is mounted on the outer end of the arm 36r of the crank axle 31r, and the bearing portion 32r is turned inwardly along the channel 22, to be mounted in exactly the same manner as is illustrated in Fig. 7 in reference to the axle 31. The spring suspension generally designated by the numeral 91 is a left hand form of the suspension provided for the wheel 20. Otherwise there are no changes.

The yoke 72, which is operated by the hydraulic cylinder 70, has an arm 92 in parallelism with the arm 73 to extend forwardly to interconnect between the ears 93 and 94 fixed to the sleeve 95 which is a left hand counterpart of the sleeve 45, and the same latching means is employed as is illustrated in Figs. 7–10 inclusive.

The front wheels 96 and 97 are mounted on the crank axles 98 and 99 respectively in exactly the same manner as that described in reference to the axle 31. The spring suspension for the wheel 96, generally designated by the numeral 100, is an identical counterpart in all of its details with that of the spring suspension, generally designated by the numeral 101, which has been described in reference to the suspension of the axle 31 in respect to the wheel 20.

The suspension 102 in reference to the right hand axle 99 is a right hand counterpart of the left hand suspension 100. A double acting hydraulic cylinder 103 is interconnected through its piston rod 104 to the yoke 105 which has the forwardly extending arms 106 and 107 interconnecting respectively between the ears 108, 109, and 110, 111, each pair in turn being secured to the respective sleeves 112 and 113. The identical latch arrangement as above described is employed to retain the sleeves 112 and 113 in the selected locked position.

This spring suspension in relation to the left hand front axle 98 is illustrated on a larger scale in Fig. 4. In the front axle suspension for each wheel 96 and 97, each suspension being entirely independent of the other, as is the case with the rear wheels 20 and 90, some means has to be provided to permit steering of those wheels 96 and 97. In this case the axles 98 and 99 have steering knuckles 114 and 115 pivoted to their outer ends respectively. The king pins 116 and 117, Fig. 3, are given the proper angles of inclinations which are commonly understood in automotive practice in order to provide the proper turning of the wheels 96 and 97 on the axes of those pins.

From the respective steering knuckles 114 and 115, there extend forwardly the steering arms 118 and 119, to the forward ends of which are respectively pivotally connected the drag links 120 and 121. The drag links 120 and 121 are in turn rockably interconnected to a stub tongue 122 which is pivoted by its rear end to the cross member 123, Fig. 3.

This stub tongue 122 is located between the upper and lower plates 18 and 19 of the frame 15, so that the stub tongue 122 is confined entirely within the height of the side channels 16 and 17. The drag links 120 and 121 extend through the forward end portions of these side channels 16 and 17, such as through a window 124, Fig. 1, to be entirely free to travel therethrough as the stub tongue 122 may be shifted horizontally to effect the turning of the wheels 96 and 97. The forward end of the stub tongue 122 extends through an opening 125 provided horizontally across the forwardmost channel 126 of the frame 15.

Both of the hydraulic cylinders 70 and 103 are located to be entirely between the top and bottom elevations of the side channels 16 and 17, and hence to be within the plates 18 and 19. As indicated in Fig. 3, these cylinders are respectively hinged to cross channels 127 and 128 which extend across the frame 15 between the top and bottom plates 18 and 19. For the sake of clarity in disclosing the construction which enters into the invention, fenders, a lubricating system, and the hydraulic control lines have been omitted.

The hydraulic cylinder 103 operates the sleeves 112 and 113 in order to lower the forward end of the platform 15 simultaneously with the operation of the cylinder 70 so that the spring suspension is relatively elevated in respect to the platform as illustrated in Fig. 4. This is possible even though the front wheels 96 and 97 are steerable. It is to be noted that the arms 118 and 119 extend well forwardly so that there is little difference between the position of the pivot interconnection of the drag links 120 and 121 with the forward ends of those arms and the horizontal axis through the portions of the axles 98 and 99 which extend along the cross member 123. The degree of shift of these sleeves 112 and 113 will depend, of course, upon the diameter of the tires of the wheels in any one of the four instances. This degree will run in the neighborhood of from forty-five to fifty-five degrees, and in such travel it will be noted that the drag link 120, for example, Fig. 4, is only slightly lifted to its dash line position which is well within the limits of the degrees of pivoting of the ends of the drag links.

Thus it is to be seen that the construction described provides that all of the various mechanisms of the elements entering into the wheel supports be always above the under side of the side channels 16 and 17, and where the lower plate 19 is employed, be confined entirely within the space between the top and bottom plates 18 and 19, with the exception of the spring suspension itself, and even then, all of this suspension is spaced above the under side of the plate 19. In this manner, the under side of the frame 15 is left entirely smooth and free of any obstructions so that in the event the wheels become mired down in mud or snow, the under side plate 19 will serve as a surface over which the entire structure may be pulled in the nature of a sled. In so doing, the wheels may be relatively lifted as indicated by the dash lines in Figs. 4 and 5, or they may be left lowered so that the structure may be elevated when those wheels strike something solid in which they are not embedded. Likewise when it is desired to load an extremely heavy piece of apparatus or the like on the platform 15, the platform 15 may be lowered by relatively lifting the wheels as indicated, and then through the hydraulic cylinders 70 and 103, the platform 15 will be restored to its normal elevation freely suspended between the four wheels, each wheel being absolutely separately suspended in relation to any other wheel so that the wheels are always in contact with the surface over which the trailer is being drawn.

The structure lends itself very readily to what may be termed a "packaged" method of selling and converting older trailers into this individually sprung construction. In other words, there would be the two right and left hand sets of units which can be quickly bolted onto the existing structure after the other wheel suspension has been removed.

In any event, it is to be seen that there is an extremely simple and yet most effective construction provided which will carry heavy loads on the trailer and also which will permit the trailer to travel empty without bouncing and having side sway. While the invention has been described in detail in relation to the particular form illustrated, it is obvious that structural changes may be provided in the structure without departing from the spirit of the invention, and I therefore do not desire to be limited to that precise form any more than may be required by the limitations of the following claims.

I claim:

1. For attachment to a trailer frame; crank axles individually mountable on the frame, each of said axles having a bearing length to extend transversely of the frame, an arm extending rearwardly from an end of said length, and a wheel bearing carrying end outturned from the outer end of said arm; and a spring suspension having one portion normally to be fixed relative to said frame and another portion rocking with said arm; a bearing housing for attachment to said frame and into which housing said axle bearing length is revolubly received and carried; means for limiting travel of the axle length longitudinally of said housing; means extending from said housing to secure said housing to said frame; a sleeve revolubly telescoped over said housing; said one portion of the spring suspension being anchored to said sleeve to be carried thereby; means for rocking said sleeve to selected positions; and means yieldingly tying together said two spring suspension portions.

2. For attachment to a trailer frame; crank axles individually mountable on the frame, each of said axles having a bearing length to extend transversely of the frame, an arm extending rearwardly from an end of said length, and a wheel bearing carrying end outturned from the outer end of said arm; and a spring suspension having one portion normally to be fixed relative to said frame and another portion rocking with said arm; a bearing housing for attachment to said frame and into which housing said axle bearing length is revolubly received and carried; means for limiting travel of the axle length longitudinally of said housing; means extending from said housing to secure said housing to said frame; a sleeve revolubly telescoped over said housing; said one portion of the spring suspension being anchored to said sleeve to be carried thereby; means for rocking said sleeve to selected positions; and means yieldingly tying together said two spring suspension portions; stop means interposed between said housing and said sleeve limiting circumferential travel of the sleeve about the housing.

3. For attachment to a trailer frame; crank axles individually mountable on the frame, each of said axles having a bearing length to extend transversely of the frame, an arm extending rearwardly from an end of said length, and a wheel bearing carrying end outturned from the outer end of said arm; and a spring suspension having one portion normally to be fixed relative to said frame and another portion rocking with said arm; a bearing housing for attachment to said frame and into which housing said axle bearing length is revolubly received and carried; means for limiting travel of the axle length longitudinally of said housing; means extending from said housing to secure said housing to said frame; a sleeve revolubly telescoped over said housing; said one portion of the spring suspension being anchored to said sleeve to be carried thereby; means for rocking said sleeve to selected positions; and means yieldingly tying together said two spring suspension portions; stop means interposed between said housing and said sleeve limiting circumferential travel of the sleeve about the housing; and latch means retaining said sleeve in selected positions of revolution about said housing.

4. For attachment to a trailer frame; crank axles individually mountable on the frame, each of said axles having a bearing length to extend transversely of the frame, an arm extending rearwardly from an end of said length, and a wheel bearing carrying end outturned from the outer end of said arm; and a spring suspension having one portion normally to be fixed relative to said frame and another portion rocking with said arm; a bearing housing for attachment to said frame and into which housing said axle bearing length is revolubly received and carried; means for limiting travel of the axle length longitudinally of said housing; means extending from said housing to secure said housing to said frame; a sleeve revolubly telescoped over said housing; said one portion of the spring suspension being anchored to said sleeve to be carried thereby; means for rocking said sleeve to selected positions; and means yieldingly tying together said two spring suspension portions; stop means interposed between said housing and said sleeve limiting circumferential travel of the sleeve about the housing; and latch means retaining said sleeve in selected positions of revolution about said housing; said latch means being operable through travel of said rocking means; means biasing said latch means toward latched condition; and lost motion means between said latch means and said rocking means operating to actuate said latch means from its latching condition prior to rocking of said sleeve.

5. For attachment to a trailer frame; crank axles individually mountable on the frame, each of said axles having a bearing length to extend transversely of the frame, an arm extending rearwardly from an end of said length, and a wheel bearing carrying end outturned from the outer end of said arm; and a spring suspension having one portion normally to be fixed relative to said frame and another portion rocking with said arm; said spring suspension comprising a load spring interposed between said two portions tending to separate those portions, and a second spring mounted on one portion tending to resist separation of the two portions, and a bolt between said two portions and said second spring initially holding both springs in compression, the length of the bolt limiting expansion of said load spring by contraction of said second spring.

6. In a stub axle mounting, a housing receiving a portion of the axle revolubly therein from one end; said housing having an internally threaded portion; and said axle portion having a threaded portion engaged in said housing threaded portion and free to have the axle revolve relative to the housing; said threaded interconnection between the axle and the housing forming a revoluble two-way thrust retention of the axle in respect to longitudinal travel thereof in said housing.

7. In a stub axle mounting, a housing receiving a portion of the axle revolubly therein from one end; said housing having an internally threaded portion; and said axle portion having a threaded portion engaged in said housing threaded portion and free to have the axle revolve relative to the housing; said threaded interconnection between the axle and the housing forming a revoluble two-way thrust retention of the axle in respect to longitudinal travel thereof in said housing; and a bearing surface within said housing to one side of said housing threaded portion radially supporting said axle; a crank arm extending from said stub axle; a lower spring bearing member carried by said arm; an upper spring bearing member; a load carrying spring between said two members; a rebound spring carried by one of said members; and means tying said two bearing members together through both of said springs.

8. In a stub axle mounting, a housing receiving a portion of the axle revolubly therein from one end; said housing having an internally threaded portion; and said axle portion having a threaded portion engaged in said housing threaded portion and free to have the axle revolve relative to the housing; said threaded interconnection between the axle and the housing forming a revoluble two-way thrust retention of the axle in respect to longitudinal travel thereof in said housing; and a bearing surface within said housing to one side of said housing threaded portion radially supporting said axle; a crank arm extending from said stub axle; a lower spring bearing member carried by said arm; an upper spring bearing member; a load carrying spring between said two members; a rebound spring carried by one of said members; and means tying said two bearing members together through both of said springs; a sleeve revolubly mounted in respect to said axle; said upper spring bearing member being carried by said sleeve; and means holding said sleeve fixed in relation to circumferential travel of the axle.

9. A trailer frame; a plurality of crank axles each having a straight length extending within the frame generally transversely thereof; bearing housings fixed within the frame individually receiving said axle lengths; a spring suspension unit interposed between the crank of each of said axles and said frame, said units being mounted to extend in entirety above said cranks; steering knuckles carried by a forward set of said axles; steering linkage extending from said knuckles into said frame, all of said linkage being at and above the levels of said cranks; and said frame having a sled bottom.

10. A trailer frame; a plurality of crank axles each having a straight length extending within the frame generally transversely thereof; bearing housings fixed within the frame individually receiving said axle lengths; a spring suspension unit interposed between the crank of each of said axles and said frame, said units being mounted to extend in entirety above said cranks; steering knuckles carried by a forward set of said axles; steering linkage extending from said knuckles into said frame, all of said linkage being at and above the levels of said cranks; and said frame having a sled bottom; and means within said frame above said bottom to raise and lower said spring suspensions in respect to said frame.

11. In a stub axle mounting, a housing receiving a portion of the axle revolubly therein from one end; said housing having an internally threaded portion; and said axle portion having a threaded portion engaged in said housing threaded portion and free to have the axle revolve relative to the housing; said threaded interconnection between the axle and the housing forming a revoluble two-way thrust retention of the axle in respect to longitudinal travel thereof in said housing; and a bearing surface within said housing to one side of said housing threaded portion radially supporting said axle; a crank arm extending from said stub axle; a lower spring bearing member carried by said arm; an upper spring bearing member; a load carrying spring between said two members; a rebound spring carried by one of said members; and means tying said two bearing members together through both of said springs; a sleeve revolubly mounted in respect to said axle; said upper spring bearing member being carried by said sleeve; and means holding said sleeve fixed in relation to circumferential travel of the axle; a vehicle frame member to which said housing is fixed; said sleeve holding means comprising a pin biased toward a latching position; a surface carried by said sleeve to be in the path of said pin; a pin guide held in fixed relation to said frame member, through which guide said pin may travel; a sleeve rocking member having a lost motion connection between it and said sleeve; said sleeve carried surface having spaced abutments in the path of said pin; and means actuated by said rocking member in its lost motion travel to shift said pin out of the path of said abutments.

HARRY B. KUSTER.

References Cited in the file of this patent

UNITED STATES PATENTS

| Number | Name | Date |
|---|---|---|
| 2,175,298 | Leighton | Oct. 10, 1939 |
| 2,453,388 | Schramm | Nov. 9, 1948 |
| 2,477,822 | Probst | Aug. 2, 1949 |